United States Patent
Schuetze et al.

(10) Patent No.: US 6,751,612 B1
(45) Date of Patent: Jun. 15, 2004

(54) USER QUERY GENERATE SEARCH RESULTS THAT RANK SET OF SERVERS WHERE RANKING IS BASED ON COMPARING CONTENT ON EACH SERVER WITH USER QUERY, FREQUENCY AT WHICH CONTENT ON EACH SERVER IS ALTERED USING WEB CRAWLER IN A SEARCH ENGINE

(75) Inventors: Hinrich Schuetze, San Francisco, CA (US); Jan Pedersen, Los Altos Hills, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/450,259

(22) Filed: Nov. 29, 1999

(51) Int. Cl.[7] ............................................... G06F 17/30
(52) U.S. Cl. ........................ 707/4; 707/1; 707/2; 707/3; 707/10; 707/100; 707/102; 715/501.1; 715/513; 709/218; 709/223
(58) Field of Search .............................. 707/100–104.1, 707/500–501.1, 513–514, 526, 530–531, 1–10; 709/200–219, 223–226, 245; 345/846, 839, 747, 760, 779; 725/46, 43; 715/501.1, 510–513; 713/200–202

(56) References Cited

U.S. PATENT DOCUMENTS

| 5,371,676 A | * | 12/1994 | Heemels et al. | ............. 707/532 |
| 5,951,642 A | * | 9/1999 | Onoe et al. | ................... 709/224 |
| 5,978,828 A | * | 11/1999 | Greer et al. | .................... 707/10 |
| 6,061,686 A | * | 5/2000 | Gauvin et al. | ................. 707/10 |
| 6,119,114 A | * | 9/2000 | Smadja | .................... 707/103 R |
| 6,185,558 B1 | * | 2/2001 | Bowman et al. | .............. 705/37 |
| 6,266,060 B1 | * | 7/2001 | Roth | ........................... 345/733 |
| 6,275,820 B1 | * | 8/2001 | Navin-Chandra et al. | ...... 707/10 |
| 6,286,006 B1 | * | 9/2001 | Bharat et al. | .................. 707/10 |
| 6,304,864 B1 | * | 10/2001 | Liddy et al. | .................... 706/15 |

FOREIGN PATENT DOCUMENTS

| EP | 0889419 | * | 1/1999 | ..................... 17/30 |
| EP | 1158427 | * | 11/2001 | ..................... 17/30 |

OTHER PUBLICATIONS

Adele et al., SavvySearch: A meta–Search engine that learns which search engines to query Jan. 28, 1997, p. 1–12.*

Evangelos et al., Effective Resource Discovery on the world wide web, proceeding of the webnet '98 world conference, pp 1–6.*

Douglis, F. and Ball, T., "Tracking and Viewing Changes on the Web," *USENIX 1996 Annual Technical Conference*, San Diego, California, Jan. 1996, pp. 1–17.

Tomasic, A., et al., "Data Structures for Efficient Broker Implementation," *ACM Transactions on Information Systems*, vol. 15, No. 3, Jul. 1997, pp. 223–253.

Manning, C. and Schütze, H., *Foundations of Statistical and Natural Language Processing*, Chapter 15 "Topics in Information Retrieval" and Chapter 16 "Text Categorization," MIT Press, 1999, pp. 477–548.

* cited by examiner

*Primary Examiner*—Srirama Channavajjala
(74) *Attorney, Agent, or Firm*—Fliesler Meyer LLP (57) ABSTRACT

A system, computer readable medium and method for searching for recently altered documents on the World Wide Web is provided. The method selects a server to be searched or crawled by a Web crawler based on a user selected ranking. Servers are ranked by a filter program which compares a user query with the content of a server and the frequency in which content is altered. A top percentage of ranked servers are crawled and the recently altered information, such as hyperlinks, are then provided to the user.

24 Claims, 7 Drawing Sheets

FIG. 1A

USER INTERFACE FORM
100

- 101 — USER: ADRIANA DE ANDRADE OLIVEIRA
- 102 — QUERY1: [MUSIC MOVIES THEATER DANCE ENTERTAINMENT]
- 103 — SEARCH INTERVAL: [DAILY]
- 104 — RANKING SELECTION
  - 104a — CONTENT: [ ]
  - 104b — FREQUENCY: [ ]
  - 104c — CONTENT AND FREQUENCY: [x]
- 105 — PERCENTAGE SEARCHED: [20] %

- 106 — QUERY2: [SPORTS SOCCER BASEBALL ESPORTE FUTEBOL]
- 106a — SEARCH INTERVAL: [WEEKLY]
  - RANKING SELECTION
    - CONTENT: [ ]
    - FREQUENCY: [x]
    - CONTENT AND FREQUENCY: [ ]
  - PERCENTAGE SEARCHED: [10] %

USER QUERY GENERATE SEARCH RESULTS THAT RANK SET OF SERVERS WHERE RANKING IS BASED ON COMPARING CONTENT ON EACH SERVER WITH USER QUERY, FREQUENCY AT WHICH CONTENT ON EACH SERVER IS ALTERED USING WEB CRAWLER IN A SEARCH ENGINE

FIELD OF THE INVENTION

The present invention relates to searching for information and, in particular, searching for information on a computer network.

BACKGROUND OF THE INVENTION

Computer networks, such as the World Wide Web (the "Web", a.k.a. the "Internet") have resulted in large amounts of information distributed across an enormous number of processing devices or computers. For example, an electronic representation of a document may be stored at a "website" of a computer connected to the Web. The document may include multiple pages in which a page is added frequently or a page is altered frequently.

Often, a search engine is used in retrieving a document on the Web. A search engine is typically a remotely accessible software program which indexes Internet addresses (universal resource locators ("URLs"), usenet, file transfer protocols ("FTPs"), image locations, etc). A search engine typically returns a list of "hyperlinks" or Internet addresses of information from an index in response to a query. A user query may include a keyword, a list of keywords or a structured query expression, such as boolean query.

A typical search engine contains a special program often called a "crawler" or sometimes called a "spider" or "bot". A search engine "crawls" the Web by performing a search of the connected computers that store the information and makes a copy of the information. Sometime later, the search engine will process a copy of the information and modify the search engines existing index to reflect the new information available on the Web. The search engine may catagorize the information in order to quickly provide a user with relevant information in response to a query.

However, because of the vast amount of distributed information currently being added daily to the Web, maintaining an up-to-date index of information in a search engine is extremely difficult. A user may not obtain the most recent information from a search engine even though the information is at a website which has been recently published or a previously published website which has an altered page. The most recent information will likely be the most valuable, but is often not indexed in the search engine. Also, search engines do not typically use a user's personal search information in updating the search engine index.

Therefore, it is desirable to provide an information system, computer readable medium and method for searching for current relevant information on a processing device network, such as the Web. Relevant information which has been recently published or altered on the Web should be provided by the search engine. User's personal search information should also be used in order to provide relevant current information.

SUMMARY OF THE INVENTION

Generally, an embodiment of the present invention is directed toward selectively searching the Web for relevant current information based on user personal search information (or filtering profiles). By selectively searching the Web, relevant information that has been added recently will more likely be discovered. A user provides personal search information such as a query and how often a search is performed to a filtering program. The filtering program invokes a Web crawler to search selected or ranked servers on the Web based on a user selected search strategy or ranking selection. The filtering program directs the Web crawler to search a predetermined number of ranked servers based on: (1) the likelihood that the server has relevant content in comparison to the user query ("content ranking selection"); (2) the likelihood that the server has content which is altered often ("frequency ranking selection"); or (3) a combination of (1) and (2) ("both content and frequency ranking"). The recently altered relevant information, or hyperlinks to such information, is then provided to the user.

An information system for providing recently altered information on a computer network, such as the World Wide Web, is provided. The information system comprises a user processing device, a first content processing device, and a search engine processing device coupled to the Web. The user processing device includes a processor readable memory storing a user interface program for obtaining user information. The first content processing device has a first type of content information which is altered at a first frequency. The search engine software program includes a Web crawler software program for obtaining content information responsive to (1) a comparison of the first type of information with the user information, and (2) the first frequency.

According to an embodiment of the present invention, the user information is a query including a keyword, a search interval including a time value, and a percentage searched including a percentage value.

According to another embodiment of the present invention, the first frequency is the number of page alterations per day, the number of page alterations per week, the number of page alterations per month, or the number of page alterations per year.

According to another embodiment of the present invention, the first frequency is an average of (1) the number of page alterations in the preceding day, (2) the number of page alterations in the preceding week, (3) the number of page alterations in the preceding month, and (4) the number of page alterations in the preceding year.

According to another embodiment of the present invention, the search engine software program obtains a content vector of the content information and a comparison is made between the content vector and the user information to obtain a content score.

According to another aspect of the present invention, the information system further comprises a second content processing device coupled to the Web. The second content processing device has a second type of content information which is altered at a second frequency. The search engine ranks the first and second processing devices based on a: (1) comparison of the user information with the first type of content; (2) comparison of the user information with the second type of content; (3) the first frequency; and (4) the second frequency.

According to another aspect of the present invention, an article of manufacture, including a computer readable memory for searching for recently altered documents is provided. The computer readable memory comprises a first software program for obtaining user information. A second software program provides a first content value of a first document at a first processing device address, responsive to a comparison of the user information with the content of the first document. A second software program obtains a first frequency of alterations to the content of the first document.

According to another aspect of the present invention, the article of manufacture further comprises a fourth software program for ranking the first processing device address on a list based on a comparison of the first content value and a second content value of a second document having a second processing device address.

According to still another aspect of the present invention, the first document is stored on a first computer connected to a network and the second document is stored on a second computer connected to the network.

According to still another aspect of the present invention, a method for obtaining information from the World Wide Web is provided. The method comprises the steps of selecting a user and obtaining a query from the user. A content score is then calculated for a document having an address on the World Wide Web. A frequency score for the document is then calculated. The associated address is then stored in a list of addresses based on the content score and frequency score. A subset of the list is selected and the document having the first address on the list is crawled.

According to another aspect of the present invention, the method further comprises the step of notifying the user that the content of the document has changed.

Other aspects and advantages of the present invention can be seen upon review of the figures, the detailed description, and the claims which follow. In the figures, like reference numerals indicate like components.

DETAILED DESCRIPTION

Figure 1A:
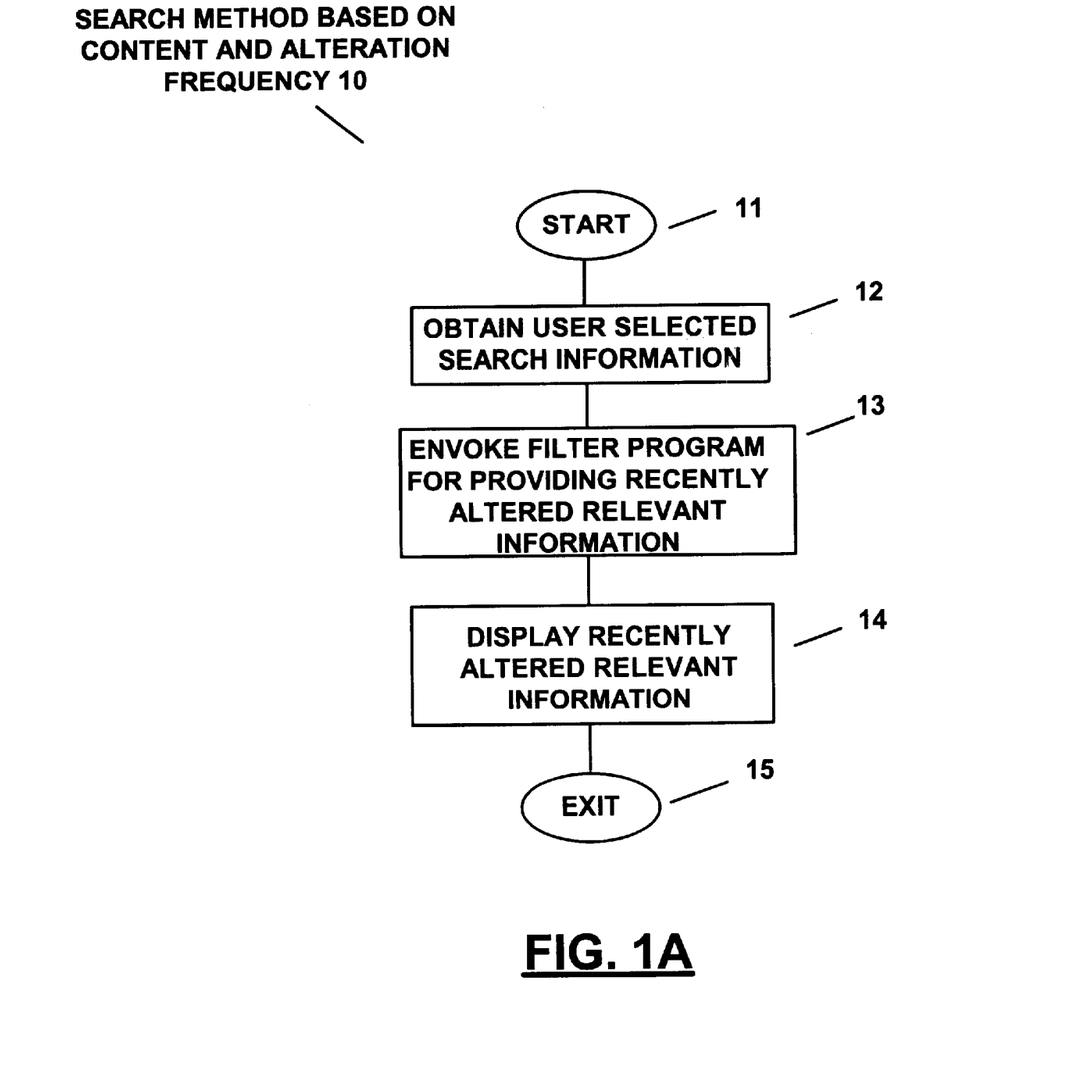
FIG. 1A illustrates a search method for retrieving information on a processing device network based on processing device content and alteration frequency, according to an embodiment of the present invention.

FIG. 1 illustrates a search method 10 for obtaining information on a processing device network, such as the Web, based on: (1) user search information; (2) processing device stored content; and (3) the frequency at which the content is altered. In an embodiment, the steps of method 10, as with other methods described herein, are performed by computer software, computer hardware, a user, or a combination thereof.

Figure 2A:
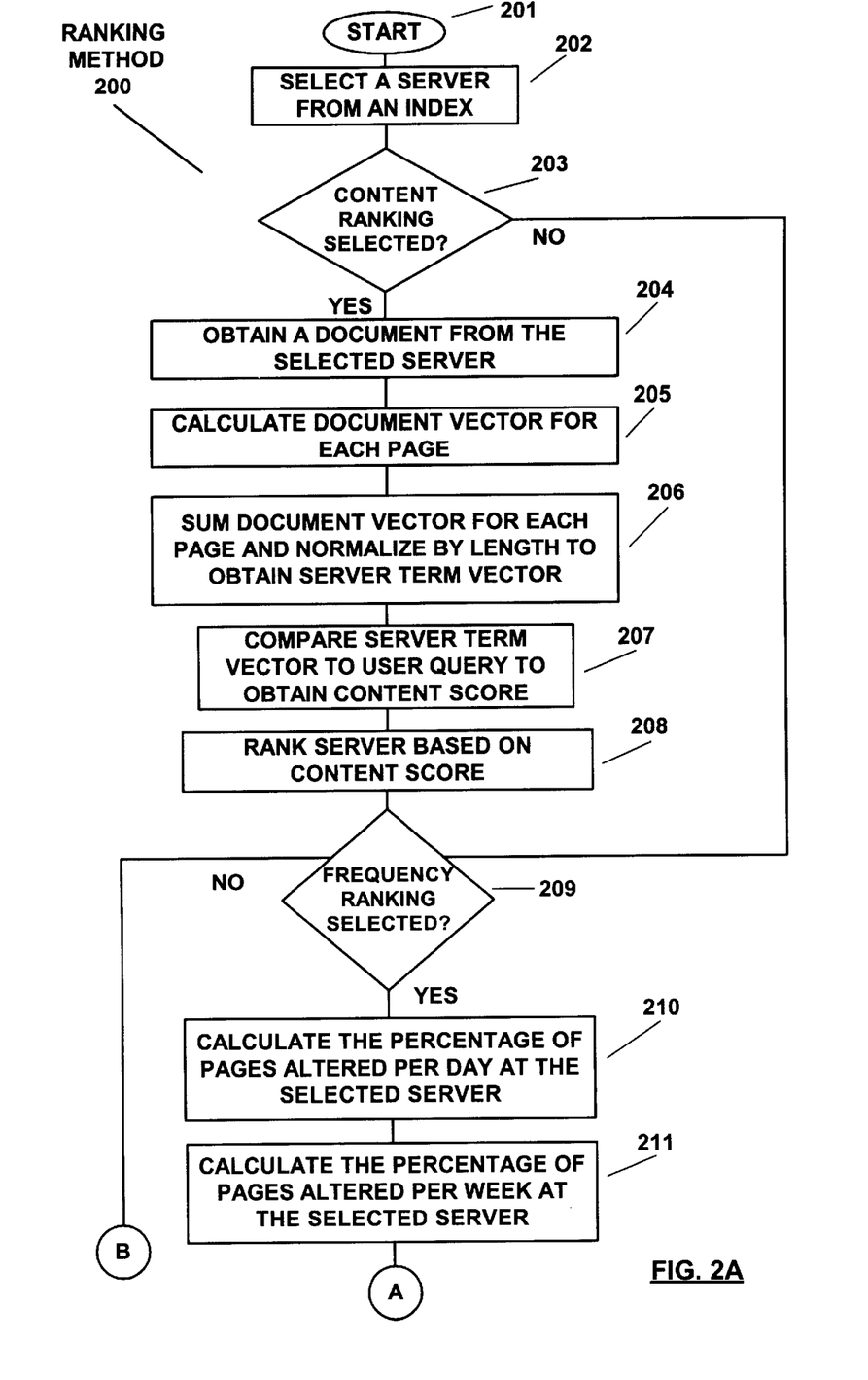
FIGS. 2A–B illustrate a processing device ranking method based on processing device content and content alteration frequency, according to an embodiment of the present invention.
Figure 2B:
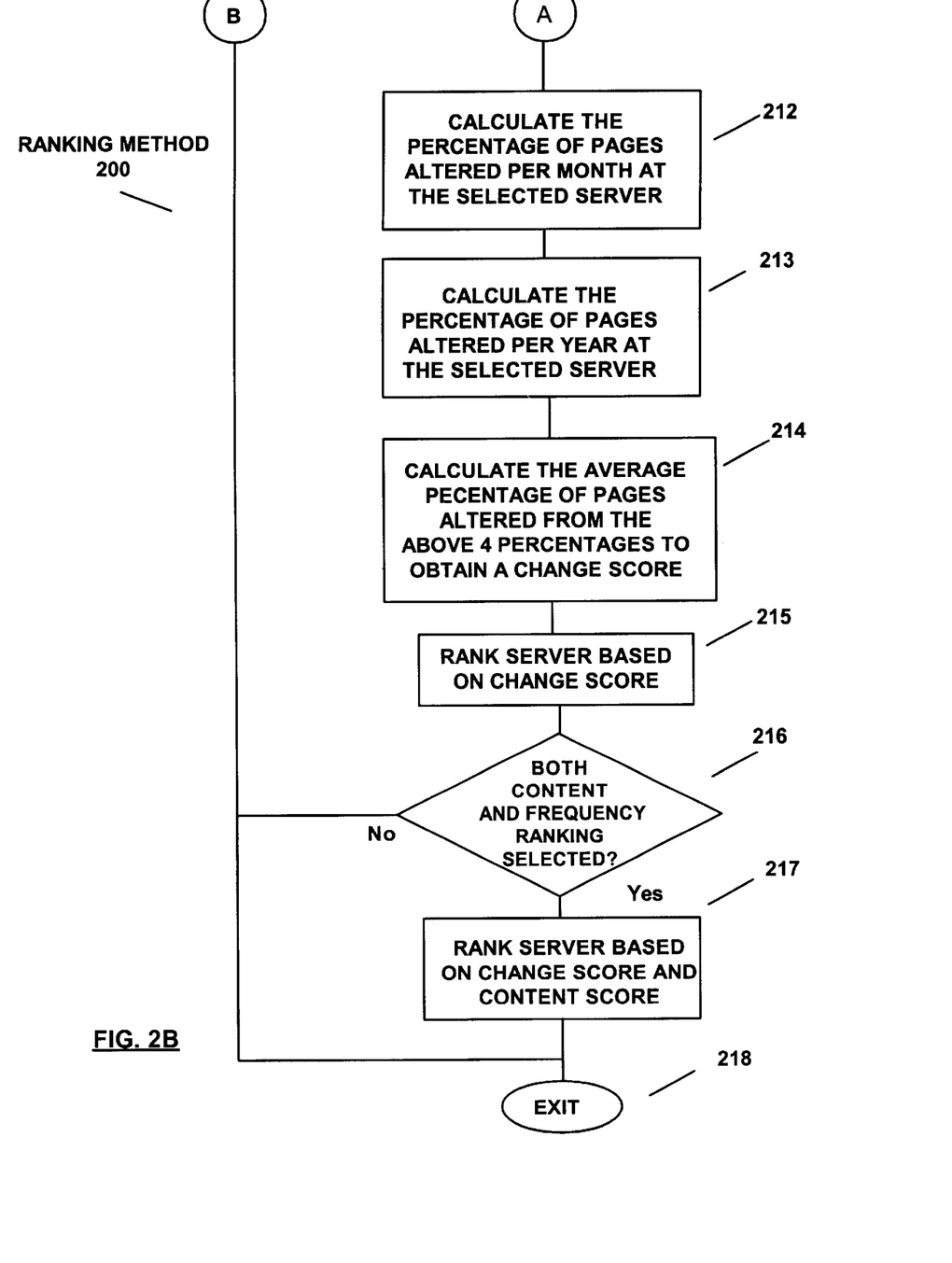
Figure 3:
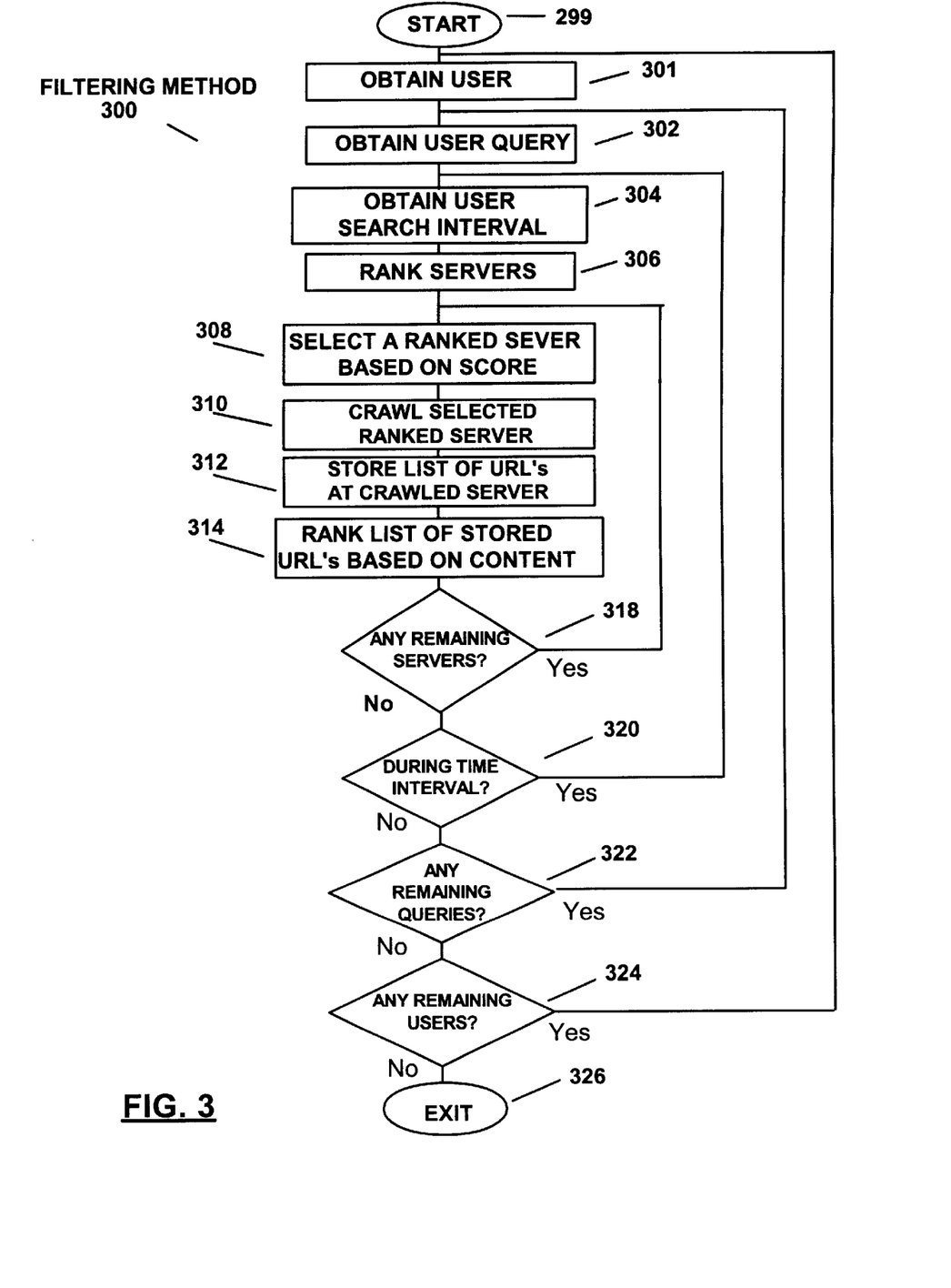
FIG. 3 illustrates a filtering method for providing a user with current relevant information, such as new content at an Internet address, based on selected user personal search information, according to an embodiment of the present invention.
Figure 4:
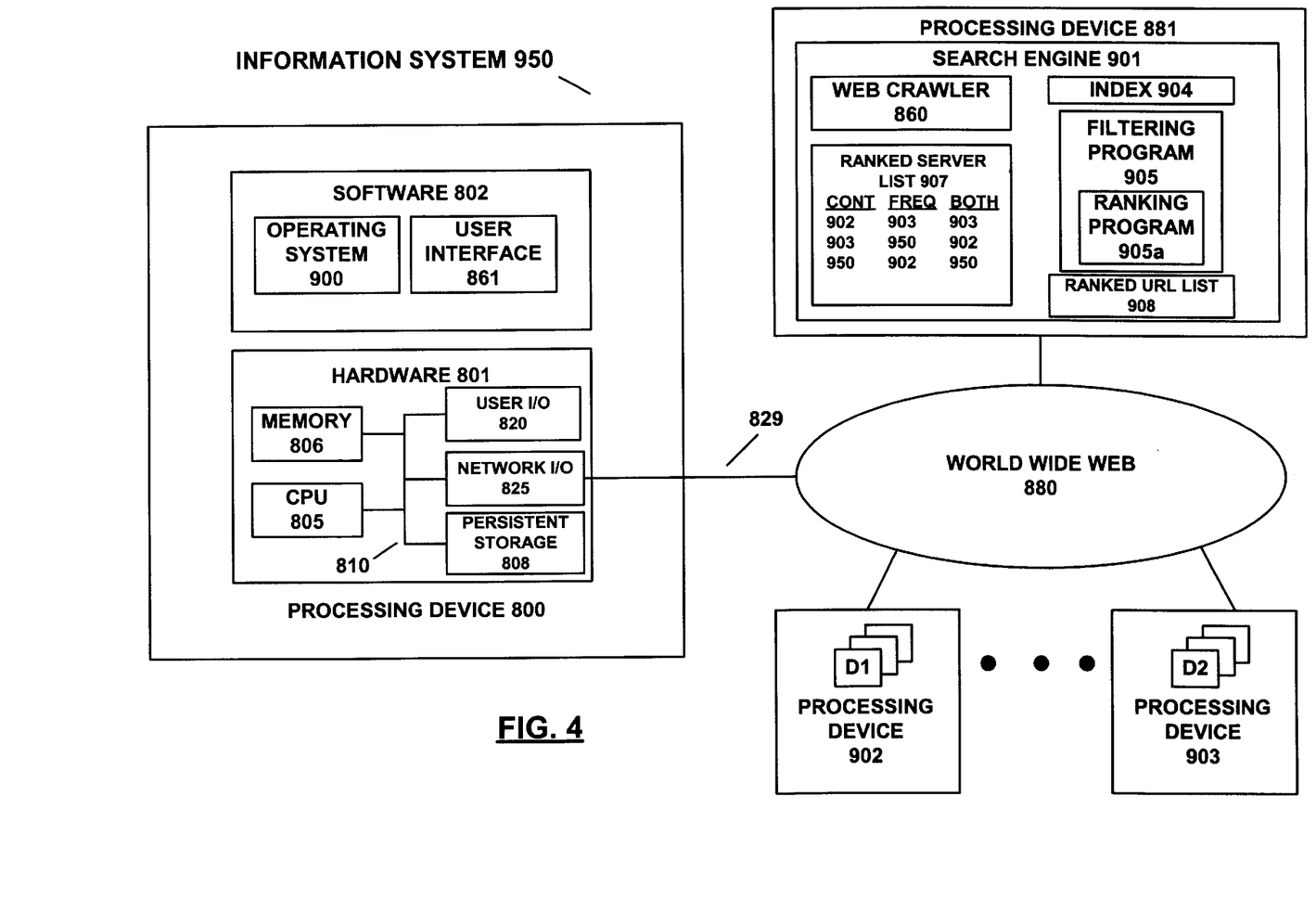
FIG. 4 is a simplified block diagram of hardware and software in an information retrieval system, according to an information system embodiment of the present invention.

Method 10 starts as illustrated by elliptic symbol 11. User personal information for a search of relevant and altered information is obtained as illustrated by logic block 12. In an embodiment, user interface software 861 illustrated in FIG. 4 is used to display user interface form 100 and user query selection form 150 illustrated in FIGS. 1B–C. A user then enters the selected search information. In an alternate embodiment, user search information may be obtained from an electronic file. In logic block 13, a filter program 905, as illustrated in FIG. 3, is then invoked to obtain recently altered and relevant information based on user personal information. As described in detail below, the filter program invokes a ranking method 200 illustrated in FIGS. 2A–B, and selectively crawls selected servers ranked by content and frequency of newly altered content. Recently altered information on the Web is then displayed to the user as illustrated in logic block 14, and the method exits as illustrated by elliptic symbol 15.

Figure 1B:
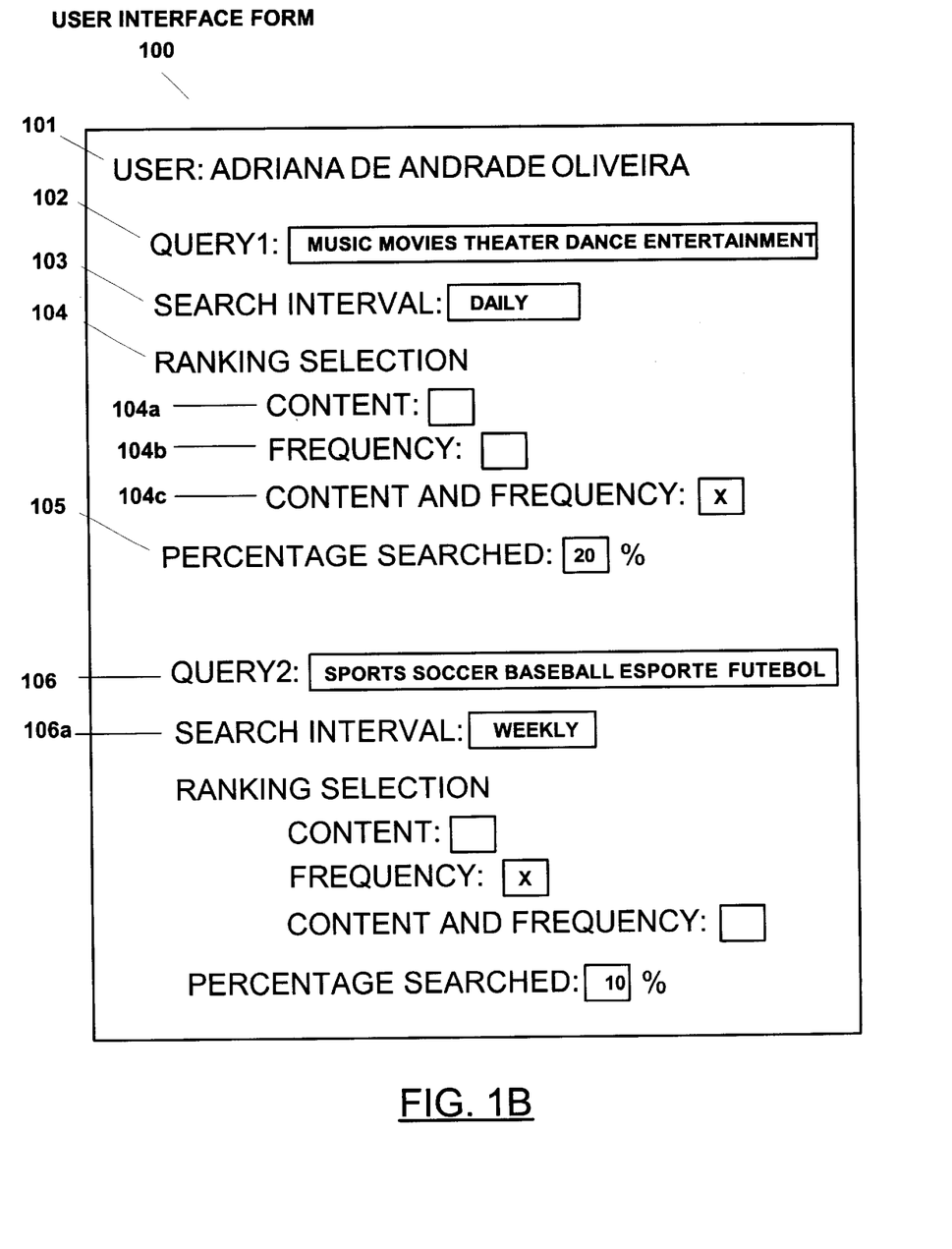
FIG. 1B illustrates a user interface form for obtaining user's personal search information, according to an embodiment of the present invention.

FIG. 1B illustrates a user interface form 100 for obtaining user personal information or a filter profile. After a user logs in to a processing device, the users name 101, for example, "ADRIANA DE ANDRADE OLIVEIRA" is displayed. The user is prompted to input search information into the appropriate fields of form 100. In an embodiment, the user search information includes a query 102, search interval 103, ranking selection 104, and percentage searched 105. In alternate embodiments, more or less information may be input into form 100. For example, a user may input a second set of search information, such as filter profile 106, associated with a second query.

In an embodiment, query 102 identifies a keyword or plurality of keywords. For example, a user may enter keywords "Music Movies Theater Dance Entertainment" into the field associated with query 102. In an embodiment, the keywords are used in a boolean disjunction query. These keywords will be used to score and rank the content of servers having relevant information. In an embodiment, search interval 103 is the frequency at which a search for updated information associated with query 102 is performed. For example, entering "DAILY" into the search interval field 103 indicates that a search using query 102 is performed daily. In an embodiment, ranking selection 104 indicates a type of ranking or predetermined list in which servers should be crawled by Web crawler 860 illustrated in FIG. 4. For example, a user may select content 104a in which servers are ranked by a content score (highest to lowest) obtained in comparing user query information to a particular server content.

A user may also select frequency 104b in which servers are ranked by a frequency score obtained by determining the number of alterations to a document per time period. In an embodiment, an alteration to a document may include the number of pages which have been deleted, the number of pages which have been added, the number of pages which have been changed, or a combination thereof.

Also, if a user selects content and frequency 104c, the search will be performed on the servers which have the best combined content score and frequency score. Also, the user may enter "20" in the percentage searched 105 field. This will indicate that only the top 20% of servers ranked having the best content score and frequency score are searched.

Figure 1C:
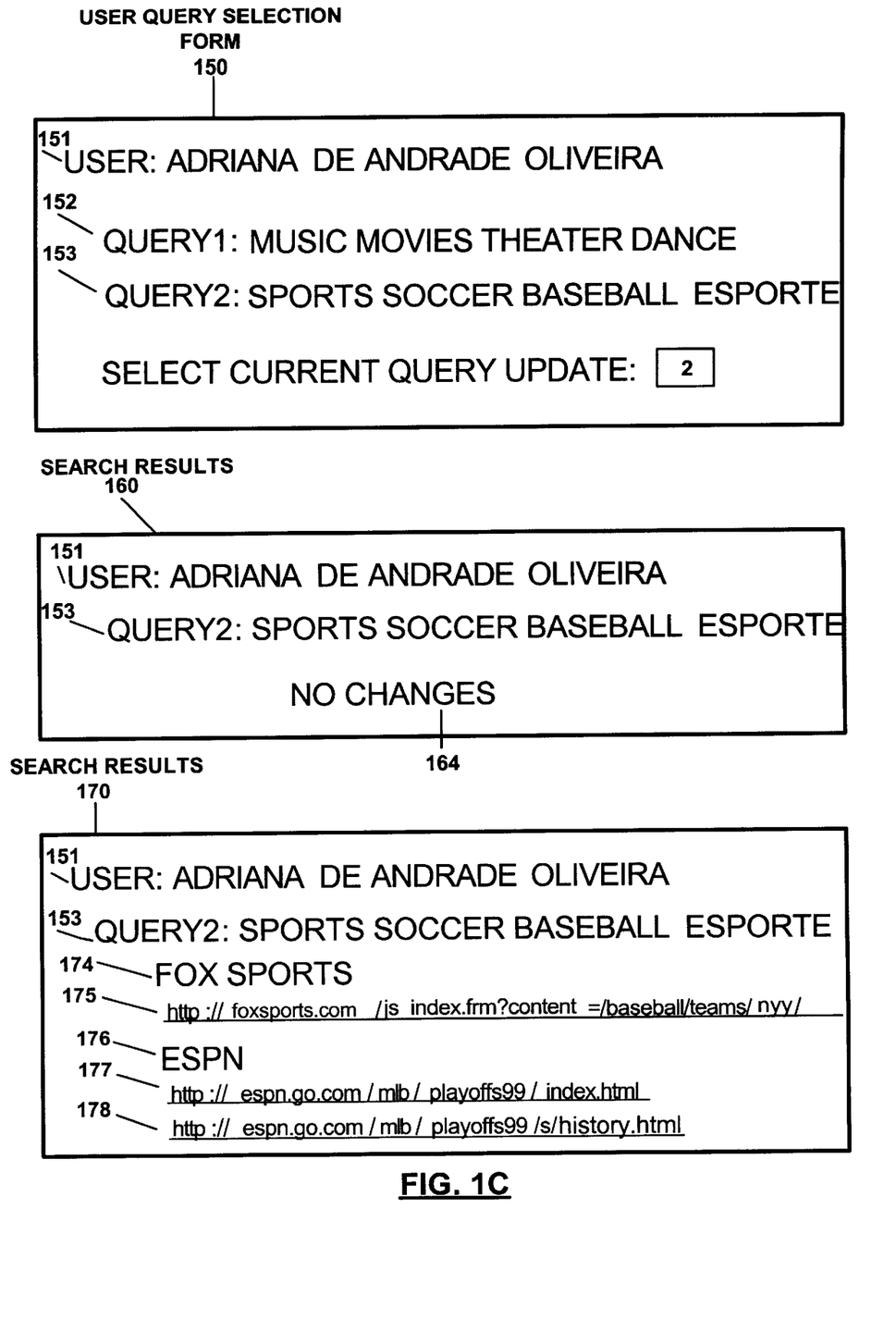
FIG. 1C illustrates a user query selection form and displayed search results, according to an embodiment of the present invention.

FIG. 1C illustrates a user query selection form 150 and displaying search results 160 and 170. If a user has multiple queries to be searched, a user needs to select which query search results should be displayed. For example, if user 151 "ADRIANA DE ANDRADE OLIVEIRA" has two queries 152 and 153 with different collections of keywords, user 151 needs to select a query for displaying an updated search. If query 153 or query 2 is selected, two possible search results may be displayed. If no recently altered information is discovered, then search results 160 is displayed: user 151, query 153 and "no change" text 163. If recently altered information has been discovered, then search results 170 is displayed: user 151, query 152, new servers 174 and 176 ("FOX SPORTS" and "ESPN", respectively) with new associated Internet addresses 175 and 177–78, respectively, ("http://foxsports.com/js_index.frm?content=/baseball/team/nyy/" and "http://eespn.go.com/mlb/playoffs99/index.html" and "http://espn.go.com/mlb/playoffs99/s/history.html".) A user then may click on the hyperlink addresses to obtain the recently altered information.

FIG. 3 illustrates a filtering method 300 according to an embodiment of the present invention. In an embodiment, filtering program 905 executes the steps of method 300. Based on user personal search information, method 300 searches selected processing devices in a predetermined order or ranked order based on: (1) a processing device content score; (2) a processing device frequency score; and (3) both a processing device content score and a processing device frequency score.

Method 300 starts as illustrated by elliptic Figure 299. A user is obtained as illustrated by logic block 301. For example, user 101 as illustrated in FIG. 1B would be obtained. A selected user query would then be obtained in logic block 302. For example, query 153 or query 2 containing the key words "SPORTS SOCCER BASEBALL ESPORTE" would be obtained in logic block 302. In alternate embodiments, other relevant search information other than key words may be utilized. A user search interval is then obtained in logic block 304. For example, a search for the most current relevant information would be done on a "weekly" basis, as illustrated in search interval 106a, illustrated in FIG. 1B.

The servers are then ranked or listed in a predetermined order based upon whether a user selects: (1) content; (2) frequency; or (3) content and frequency. In particular, the ranking server method 200 as illustrated in FIGS. 2A–B is invoked in logic block 306 in order to create the ranked server list. In alternate embodiments, ranking server method 200 is executed in batch mode, or daily, and is not invoked by filtering method 300. In an embodiment, the ranked server list 907 is stored in search engine 901 of processing device 881 shown in FIG. 4. Ranked server list 907 includes three lists of servers: a list of servers having the highest content ("CONT") score (highest to lowest); a list of servers having the highest frequency ("FREQ") score (highest to lowest); and a list of servers having both the highest aggregate content score and frequency ("BOTH") score (highest to lowest). A server with the highest score is then selected based upon either a content score, frequency score, or both content score and frequency score, as illustrated by logic block 308. The selected server is then crawled by Web crawler 860 as illustrated by logic block 310. A list of relevant altered URLs in which their corresponding content has been altered is obtained by Web crawler 860 and is then stored in URL list 908 as illustrated in logic block 312. The list of stored URLs are then ranked based on content as illustrated in logic block 314.

In logic block 318, a determination is made whether there are any remaining ranked servers on ranked server list 907 with a user percentage search 105 value. For example, if a user enters "20" in percentage searched field 105 as illustrated in FIG. 1B, the first 20% of ranked servers on list 907 would be crawled by Web crawler 860. If remaining ranked servers are available, control passes back to logic block 308, and logic blocks 310, 312, 314, and 318 are repeated. Otherwise, a determination is then made in logic block 320 whether any remaining search interval remains. For example, if the user enters "Daily" in the search interval field 103 as illustrated in FIG. 1B, the search would be performed once a day. If a search interval is not exhausted, control transfers back to logic block 304, and logic block 306, 308, 310, 312, 314, and 318 are repeated. Otherwise, control passes to logic block 322 where a determination is made whether there are any remaining queries. For example, as illustrated in FIG. 1B, a user 101 may have two queries. If there are remaining queries, control passes to logic block 302 and logic block 302, 304, 306, 308, 310, 312, 314, 318, and 320 are repeated. Otherwise, a determination is made whether there are any remaining users, as illustrated by logic block 324. If there are any remaining users, control passes back to logic block 301, and logic blocks 302, 304, 306, 308, 310, 312, 314, 318, 320, and 322 are repeated. Otherwise method 300 exits as illustrated by elliptic figure 326.

FIG. 2A illustrates method 200 for ranking a server, according to an embodiment of the present invention. Method 200 will rank a server or create a predetermined list from index 904 of search engine 901 based on: (1) a comparison of the content of the server and user personal search information; (2) frequency at which the content of the server is altered; and (3) a combination of (1) and (2). In an embodiment, method 200 is executed by ranking program 905a illustrated in FIG. 4.

Method 200 starts as illustrated by elliptic figure 201. A server is then selected from an index as illustrated by logic block 202. In an embodiment, the server may be selected from index 904 in search engine 901, as illustrated in FIG. 4. In an alternate embodiment, the initial list of servers may be obtained from predetermined list. A determination is then made whether a ranking of the server should be based upon content, as illustrated by logic block 203. If a ranking is to be created based on content, control flows to logic block 204. Otherwise, control is passed to logic block 209. A document is obtained from the selected server, as illustrated in logic block 204. A document vector for each page of the document is calculated as illustrated in logic block 205. In an embodiment, the document vector for each page is calculated as described by the space vector method in Chapter 15 of "Foundations of Statistical and Natural Language Processing", Manning and Schuetze, MIT Press 1999, incorporated herein by reference in its entirety. The document vector for each page in a document is then summed and normalized by a unit length to obtain a server term vector as illustrated in logic block 206. A comparison between the server term vector and a user query is completed in order to obtain a content score, as illustrated by logic 207. In an embodiment, the content score is obtained as described in the above-referenced book entitled "Foundations of Statistical and Natural Language Processing." The selected server is then ranked based on its content score and stored in ranked server list 907 illustrated in FIG. 4. For example, if processing device 902 stored a Document D1 having a content score of 15, and processing device 903 stored a Document D2 having a content score of 7, processing device 902 is listed first and processing device 903 is listed second in ranked server list 907 under "CONT".

If a user selects ranking a server based upon the frequency of content altered, control passes to logic block 210. Otherwise, content method 200 exits, as illustrated by elliptic figure 218. The percentage of pages in the document altered per day at the selected server is then obtained. The percentage of pages altered in the document per week at the selected server is then obtained in logic block 211. The percentage of pages altered in the document per month at the selected server is then completed in logic block 212. The percentage of pages altered in the document per year at the selected server is completed in logic block 213. An average of the percentages of pages altered in the four time periods is then calculated to obtain a frequency score in logic block 214. Similar to content score, the server is then ranked based on frequency score, as illustrated in logic block 215.

A determination is made whether the user selected a ranking based both on content and frequency alterations in logic block 216. If the user did not select both content and frequency alteration ranking, control exits as illustrated by elliptic figure 218. Otherwise, the servers are ranked based on both frequency score and content score. In an embodiment, both the frequency score and content score is obtained by adding the frequency score and content score. Control then exits as illustrated by elliptic figure 218.

Tables 1–3 illustrate experimental results using an embodiment of the present invention. The experiment included searching 200 servers where each server included 100 pages of content. Five queries which included multiple key words were used as test queries as illustrated in Table 1. For example, query 1 included the keywords "music movies theater dance entertainment." The percentage of altered or new pages which were discovered during a four month period for the top 10% ranked servers using the three ranking selections are illustrated in Table 2. For example, for query 1, 31% of the altered or new pages were discovered using the content ranking selection. Similarly, 15% of the altered or new pages were discovered using the frequency ranking selection, and 29% of the altered or new pages were discovered using both the content and frequency ranking selection.

Similarly, Table 3 illustrates the percentage of altered or new pages discovered in the same four month period using the top 20% of servers ranked using the three ranking selections. For example, using query 1, 39% of the altered or new pages were discovered using the content ranking selections for the top 20% of the ranked servers. Similarly, 31% of the altered or new pages were discovered using the frequency ranking selection, and 44% of the altered or new pages were discovered using both the content and frequency ranking selection.

At least one of the ranking selection methods always does better than what one would expect according to selection by chance (10% for selecting the top 10% of servers, 20% for selecting the top 20% of servers). In some cases, there is a dramatic improvement, e.g., 44% of altered or new pages are discovered using the content and frequency ranking selection for query 1 in Table 3.

TABLE 1

Test Queries

| Query | Keywords |
|---|---|
| 1 | music movies theater dance entertainment |
| 2 | computer science research university publication journals distributed systems |

TABLE 1-continued

Test Queries

| Query | Keywords |
|---|---|
| 3 | sports soccer baseball esporte futebol racing |
| 4 | tourism guide visitor map lodging food tour |
| 5 | international business brasil brazil politics economic statistics |

Search of top 10% of servers:

TABLE 2

Experimental Recall Results

| Query | Content | Frequency | Both |
|---|---|---|---|
| 1 | 31 | 15 | 29 |
| 2 | 32 | 10 | 19 |
| 3 | 19 | 4 | 21 |
| 4 | 18 | 12 | 11 |
| 5 | 13 | 10 | 10 |

Search of top 20% of servers:

TABLE 3

Experimental Recall Results

| Query | Content | Frequency | Both |
|---|---|---|---|
| 1 | 39 | 31 | 44 |
| 2 | 45 | 24 | 33 |
| 3 | 32 | 23 | 32 |
| 4 | 25 | 25 | 23 |
| 5 | 28 | 22 | 23 |

FIG. 4 illustrates hardware and software components of an exemplary information system 950 for obtaining altered relevant information on a processing device network, according to an embodiment of the present invention. The system of FIG. 4 includes a processing device 800 connected by one or more communication pathways, such as connection 829 to Web 880. Processing device 800 can communicate with other local or remote processing devices, such as processing device 881, through the Web 880. As will be appreciated, the connection from processing device 800 to Web 880 can be made in various ways, e.g., directly via connection 829 (wired or wireless), or rough local-area network(""LAN"), or by modem (not shown).

In an embodiment, processing devices 881 stores search engine 901, include Web crawler 860, ranked server list 907, index 904, filtering software program 905, including ranking program 905a and ranked URL list 908 in persistent storage. In an embodiment, Web crawler 860 creates ranked server list 907 and ranked URL list 908, providing content scores, frequency scores, and both content scores and frequency scores. In an embodiment, Web crawler 860 is built using a W3 Consortium Library, as it is known in the art, and run in batch mode to create the lists. For example, Web crawler 860 may obtain the scores at night. Crawler 860 requests documents from servers and parses them to calculate content scores. Similarly, the crawler obtains frequency scores by obtaining the last modified field of a page. As one of ordinry skill in the art appreciates, the various software program embodiments of the present invention may be stored on a single persistent storage device or distributed among different persistent storage devices at remote locations.

In an embodiment, processing devices 902 and 903 are connected to the Web and store documents D1 and D2, respectively. In an embodiment, documents D1 and D2 include different types of content information which are altered at different frequencies. In an embodiment, Documents D1 and D2 include one or more pages.

Documents D1 and D2 are accessible by processing device 800 and server 881, in particular search engine 901.

In an embodiment, an electronic representation of a document is retrieved using the present search method. A document may include a plurality of pages which partition the information. In an alternate embodiment, the document includes text, image, video, audio or a combination thereof. In an embodiment, the document includes hyperlinks pointing to further information. In still a further embodiment, the information includes a computer readable address, such as an Internet address.

In an embodiment, processing device 800 is a personal or office computer that can be, for example, a workstation, personal computer, or other single-user or multi-user computer system; an exemplary embodiment uses a Dell® Dimension® XPS B Series desktop computer (Dell Computer Company, Round Rock, Tex.). In an alternate embodiment, processing device 800 is a personal digital assistant, hand-held computer, scanner, "Smart" telephone, digital camera, printer, copier, facsimile machine, information appliance, or an equivalent thereof. In an embodiment, processing devices 881, 902, and 903 are servers which provide a service to another processing device, such as processing device 800. In an embodiment, processing devices 881, 902, and 903 have similar hardware and software components illustrated in processing device 800.

For purposes of exposition, processing device 800 can be conveniently divided into hardware components 801 and software components 802; however, persons of skill in the art will appreciate that this division is conceptual and somewhat arbitrary, and that the line between hardware and software is not a hard and fast one. Further, it will be appreciated that the line between a host processing device and its attached peripherals is not a hard and fast one, and that in particular, components that are considered peripherals of some processing devices are considered integral parts of other processing devices. Thus, for example, user I/O 820 can include a keyboard, a touch screen, a mouse, and a display monitor, each of which can be considered either a peripheral device or part of the processing device itself, and can further include a local printer, which is typically considered to be a peripheral. As another example, persistent storage 808 can include a CD-ROM (compact disc read-only memory) unit, which can be either peripheral or built into the computer.

Hardware components 801 include a processor (CPU) 805, memory 806, persistent storage 808, user I/O 820, and network interface 825. These components are well understood by those of skill in the art and, accordingly, need be explained only briefly here.

Processor 805 can be, for example, a microprocessor or a collection of microprocessors configured for multiprocessing. It will be appreciated that the role of processing device 800 can be taken in some embodiments by multiple computers acting together (distributed computation); in such embodiments, the functionality of processing device 800 in the system of FIG. 4 is taken on by the combination of these processing devices, and the processing capabilities of processor 805 are provided by the combined processors of the multiple processing devices.

Memory 806 can include a computer readable medium such as read-only memory (ROM), random-access memory (RAM), virtual memory, or other memory technologies, singly or in combination. Persistent storage 808 can include a computer readable medium, for example, a magnetic hard disk, a floppy disk, or other persistent read-write data storage technologies, singly or in combination. It can further include mass or archival storage, such as can be provided by CD-ROM or other large-capacity storage technology. (Note that processing device 881 provides additional storage capability that processor 805 can use.) In an embodiment, persistent storage 808 includes computer readable medium which stores user interface software 861.

User I/O (input/output) hardware 820 typically includes a visual display monitor such as a CRT or flat-panel display, touch screen, an alphanumeric keyboard, and a mouse or other pointing device, and optionally can further include a printer, an optical scanner, or other devices for user input and output. In an embodiment, user I/O 820 is used to input user search information and display user search results.

Network I/O hardware 825 provides an interface between processing device 800 and the outside world. More specifically, network I/O 825 lets processor 805 communicate via connection 829 with other processing devices through the Web 880.

Software components 802 include an operating system 900 and a set of tasks under control of operating system 900, such as user interface software 861. As known by one of ordinary skill in the art, operating system 900 also allows processor 805 to control various devices such as persistent storage 808, user I/O 820, and network interface 825. Processor 805 executes the software of operating system 900 and its tasks in conjunction with memory 806 and other components of processing device 800.

In an embodiment, user interface software 861 and filtering software program 905 singly or in combination is stored on a computer readable medium such as a magnetic hard disc, floppy disc, CD-ROM, or other writeable data storage technologies, singly or in combination.

Persons of skill in the art will appreciate that the system of FIG. 4 is intended to be illustrative, not restrictive, and that a wide variety of computational, communications, and information and document processing devices can be used in place of or in addition to what is shown in FIG. 4. For example, connections through the Web 880 generally involve packet switching by intermediate router computers (not shown), and processing device 800 is likely to access any number of servers, including but by no means limited to processing device 881, during a typical Web client session.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. System for monitoring the World Wide Web (WWW), comprising:
   a user interface coupled to the WWW operable to obtain user information, wherein the user information includes a query;
   a ranking component operable to rank a set of servers wherein each one of the set of servers is coupled to the WWW and wherein the ranking is based on at least one of: 1) a comparison of content on each server with the query; and 2) a frequency at which content on each server is altered; and a search engine coupled to the WWW including a Web crawler operable to search at least one of the ranked servers in order of rank based on the query and generate search results wherein the search results refer to content on ranked servers that satisfy the query.

2. The system of claim 1, wherein the user information includes a keyword.

3. The system of claim 1, wherein the user information includes a search interval value.

4. The system of claim 1, wherein the user information includes a percentage searched value.

5. The system of claim 1, wherein the frequency includes the number of alterations per day.

6. The system of claim 1, wherein the frequency includes the number of alterations per week.

7. The system of claim 1, wherein the frequency can be the number of alterations per month.

8. The system of claim 1, wherein the frequency can be the number of alterations per year.

9. The system of claim 1, wherein the frequency can be an average of (1) the number of alterations per day, (2) the number of alterations per week, (3) the number of alterations per month, and (4) the number of alterations per year.

10. The system of claim 1, wherein the comparison of content on each server with the query is accomplished by comparing a content vector for each server with the user information to obtain a content score for each server.

11. A method adapted for obtaining information from the World Wide Web (WWW) comprising the steps of:

obtaining a query;

calculating a content score of a first document having a first address on the WWW wherein the content score is based on comparing a content vector for the first document with the query;

ranking the first document in a set of documents based on at least one of: 1) the content score; and 2) a frequency at which document content is altered;

selecting a highest ranked document from the set of documents; and crawling a first processing device on which the highest ranked document is stored to obtain a first altered document.

12. The method of claim 11, further comprising:

providing a hyperlink of the first altered document to a user.

13. The method of claim 11, further comprising the steps of:

obtaining a search interval from a user; and crawling the first processing device periodically, using the search interval.

14. The method of claim 11, further comprising the steps of:

notifying a user that the content of the first document has changed.

15. The method of claim 11, wherein the step of calculating further includes:

obtaining the content vector of the first document.

16. The method of claim 11, wherein the query includes a key-word.

17. The method of claim 11, wherein the frequency based on a last modified field in the first document.

18. A machine readable medium having instructions stored thereon that when executed by a processor cause a system to:

obtain a query;

calculate a content score of a first document having a first address on the World Wide Web (WWW) wherein the content score is based on comparing a content vector for the first document with the query;

rank the first document in a set of documents based on at least one of: 1) the content score; and 2) a frequency at which content on the document is altered;

select the highest ranked document from the set of documents; and crawl a first processing device on which the highest ranked document is stored to obtain a first altered document.

19. The machine readable medium of claim 18, further comprising instructions that when executed cause a processor to:

provide a hyperlink of the first altered document to a user.

20. The machine readable medium of claim 18, further comprising instructions that when executed cause a processor to:

obtain a search interval from a user; and crawl the first processing device periodically, using the search interval.

21. The machine readable medium of claim 18, further comprising instructions that when executed cause a processor to:

notify a user that the content of the first document has changed.

22. The machine readable medium of claim 18, further comprising instructions that when executed cause a processor to:

obtain the content vector of the first document.

23. The machine readable medium of claim 18 wherein:

the query includes a keyword.

24. The machine readable medium of claim 18 wherein:

the frequency is based on a last modified field in the document.

* * * * *